US007997810B2

(12) United States Patent
Arai (10) Patent No.: US 7,997,810 B2
(45) Date of Patent: Aug. 16, 2011

(54) FOCAL PLANE SHUTTER FOR CAMERA (75) Inventor: Koji Arai, Kita (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 12/846,935

(22) Filed: Jul. 30, 2010

(65) Prior Publication Data
US 2011/0026914 A1 Feb. 3, 2011

(30) Foreign Application Priority Data
Jul. 31, 2009 (JP) ................................. 2009-179574

(51) Int. Cl.
*G03B 9/00* (2006.01)
(52) U.S. Cl. ....................................... 396/452; 396/483
(58) Field of Classification Search .................. 396/452, 396/456, 483, 486, 487
See application file for complete search history.

(56) References Cited

U.S. PATENT DOCUMENTS

| 5,581,412 | A  | * | 12/1996 | Tanaka | ........................... | 359/697 |
| 6,796,728 | B2 | * | 9/2004  | Miyazaki | ..................... | 396/463 |
| 7,699,545 | B2 | * | 4/2010  | Namai | ........................... | 396/493 |
| 7,896,561 | B2 | * | 3/2011  | Takahashi et al. | ............ | 396/489 |
| 2004/0223076 | A1 | * | 11/2004 | Nakano et al. | ................ | 348/363 |

FOREIGN PATENT DOCUMENTS

| JP | 8-201877 | 8/1996 |
| JP | 2002-55377 | 2/2002 |
| JP | 2004-212877 | 7/2004 |

* cited by examiner

*Primary Examiner* — Rodney E Fuller
*Assistant Examiner* — Linda B Smith
(74) *Attorney, Agent, or Firm* — Wenderoth, Lind & Ponack, L.L.P.

(57) ABSTRACT

A support plate and a printed wiring board are spaced from a shutter base plate. An adjusting shaft member includes first and second shaft portions and an attachment portion that is press-fitted to an attachment hole in the support plate. Each of first and second contact members is attached to the printed wiring board at one end and has a contact portion and a positioning portion at the other end. The positioning portions of the first and second contact members are respectively brought into contact with a cam-shaped peripheral surface of the first shaft portion and a circular peripheral surface of the second shaft portion. When the adjusting shaft member is rotated, the distance between the contact portions varies. Thus, the time at which the two contact portions come into contact with each other when a pushing portion of the second contact member is pressed can be adjusted.

7 Claims, 10 Drawing Sheets

FOCAL PLANE SHUTTER FOR CAMERA

BACKGROUND OF THE INVENTION

1. Field of the Invention

The present invention relates to a focal plane shutter for a camera.

2. Description of the Related Art

Recently, two types of focal plane shutters for cameras have been known: shutters including two shutter blade groups, which are called a front blade (group) and a rear blade (group), and shutters including a single shutter blade group. The former shutters are used in both digital cameras and silver-salt film cameras, while the latter shutters are used only in digital cameras. In either one of the two types of shutters, each shutter blade group includes a plurality of arms, each of which is attached to a shutter base plate in a pivotable manner at one end thereof, and a plurality of blades which are successively arranged on the arms toward free ends of the arms and supported by the arms in a pivotable manner. One or two blade chambers are formed between the shutter base plate and an auxiliary base plate (also referred to as a cover plate), and each shutter blade group is disposed in the corresponding blade chamber. Each shutter blade group performs an opening-closing operation in response to a rotation of a driving member.

An opening for an imaging optical path is formed in the shutter base plate at a central section thereof. A support plate is disposed at a side of the opening such that a plate surface of the support plate is parallel to the shutter base plate, and is attached to the shutter base plate with a predetermined space provided between the support plate and the shutter base plate. The above-described driving member is disposed in the space. In general, an electromagnet is also disposed in the space. The electromagnet is attached to the support plate and starts the rotation of the driving member in a certain direction at a predetermined time in a shooting operation.

A printed wiring board is stacked on the support plate, and a switch operated by the rotation of the driving member is attached to the printed wiring board. Japanese Unexamined Patent Application Publication No. 8-201877 (hereinafter referred to as Patent Document 1) discloses a structure in which the switch is used as a flash synchronization switch. Japanese Unexamined Patent Application Publication No. 2002-55377 (hereinafter referred to as Patent Document 2) proposes that the switch can also be used as a switch for detecting a malfunction of the driving member or the shutter blade group.

The printed wiring board is commonly manufactured using a glass epoxy copper clad laminate (also called a glass epoxy substrate), which is rigid. In addition, as described in Patent Document 1, the switch includes two flexible contact members, which are bonded to the printed wiring board at first ends thereof and are provided with contact portions at second ends thereof. In a normal state, portions near the second ends are brought into contact with different end surfaces of the printed wiring board by elasticity of the contact members, so that the contact portions are in a non-contact state. When the driving member is rotated in a certain direction and is caused to push one of the contact members, the pushed contact member moves away from the end surface of the printed wiring board. Then, the contact portion of the pushed contact member comes into contact with the contact portion of the other contact member and pushes the other contact member away from the end surface of the printed wiring board. Then, when the driving member is rotated in the opposite direction, the contact members are caused to return to the positions in the normal state by the elasticity thereof.

Accordingly, the two contact members repeatedly come into contact with and move away from the end surfaces of the printed wiring board each time the shooting operation is performed. However, in the case where the printed wiring board is rigid, since the glass epoxy copper clad laminate is used, there is a risk that small dust will be generated from the end surfaces of the printed wiring board when the contact members repeatedly come into contact with and move away from the end surfaces. In addition, there is also a risk that the surface state of the end surfaces will be changed, which leads to a contact failure of the switch or a shift in the contact time. Therefore, in order to solve such a problem, Japanese Unexamined Patent Application Publication No. 2004-212877 (hereinafter referred to as Patent Document 3) discloses a structure in which a switch attachment plate made of a synthetic resin and a flexible printed wiring board are stacked on a support plate. Two contact members are bonded to the flexible printed wiring board at first ends thereof, and portions of the contact members near second ends thereof are brought into contact with and moved away from end surfaces of the switch attachment plate.

In order for the above-described switch to reliably operate, it is, of course, necessary to reliably bring the contact portions of the two contact members into contact with each other precisely at a predetermined time. In the structure described in Patent Document 3, the two contact members are brought into contact with and moved away from the end surfaces of the switch attachment plate made of synthetic resin each time the shooting operation is performed. Therefore, unlike the case in which the glass epoxy copper clad laminate is used, the problem that the small dust will be generated from the end surfaces when the contact members repeatedly come into contact with and move away from the end surfaces and the problem that the surface state of the end surfaces will be changed do not occur. Therefore, the switch can be reliably operated.

However, as is well known, this type of products have individual differences after assembly, owing to processing tolerance and assembly tolerance of components. Therefore, even when no problems are expected after the products are installed in cameras and sold as in the structure of Patent Document 3, it is necessary to perform inspection after the assembly and make an adjustment if necessary since individual differences are caused in the manufacturing process, as is well known. In such a case, a worker slightly changes the shapes of the contact members so that a predetermined function can be obtained. However, since it is necessary to perform such an adjustment in the assembly phase and not before the installation of the product, the adjustment is difficult and it takes a long time even for a skilled worker to make the adjustment.

SUMMARY OF THE INVENTION

In order to solve the above-described problems, an object of the present invention is to provide a focal plane shutter for a camera which facilitates an individual-difference correcting process performed at the final phase of assembly. The individual-difference correcting process is performed to cause two contact portions of respective contact members of a switch to reliably come into contact with each other at a predetermined time in response to a rotation of a driving member of a shutter blade member. The switch is used to emit flashlight or detect a malfunction of a driving member.

To achieve the above-described object, according to an aspect of the present invention, a focal plane shutter for a camera includes a shutter base plate having an opening for an imaging optical path, at least one shutter blade group being disposed between the shutter base plate and an auxiliary base plate; a support plate disposed at a side of the opening such that a plate surface of the support plate is parallel to the shutter base plate, the support plate being attached to the shutter base plate with a predetermined space provided between the support plate and the shutter base plate; a printed wiring board stacked on the support plate; at least one driving member disposed in the space and rotating to operate the shutter blade group; an adjusting shaft member formed of an insulating material and including an attachment portion that is rotatably attached to the support plate and first and second shaft portions arranged along an axial direction of a rotation axis of the attachment member, a peripheral surface of one of the first and second shaft portions being formed as a circular peripheral surface centered on the rotation axis and a peripheral surface of the other one of the first and second shaft portions being formed as a cam surface such that a distance from the rotation axis to the cam surface varies; a first contact member that is bonded to the printed wiring board at one end and that has a free end at the other end, the first contact member including, at positions near the free end, a contact portion and a positioning portion that comes into contact with and moves away from the peripheral surface of the first shaft portion and having a function of causing the positioning portion to come into contact with the peripheral surface of the first shaft portion by elasticity of the first contact member; and a second contact member that is bonded to the printed wiring board at one end and that has a free end at the other end, the second contact member including a pushing portion at a position between the ends and, at positions near the free end, a contact portion and a positioning portion that comes into contact with and moves away from the peripheral surface of the second shaft portion and having a function of causing the positioning portion to come into contact with the peripheral surface of the second shaft portion by elasticity of the second contact member, the second contact member causing the contact portion of the second contact member to come into contact with the contact portion of the first contact member and causing the positioning portion of the first contact member to move away from the peripheral surface of the first shaft portion when the pushing portion is pushed by the driving member. A time at which the contact portions of the first and second contact members come into contact with each other is adjustable by rotating the adjusting shaft member.

In the focal plane shutter, the attachment portion may be provided between the first and second shaft portions in the adjusting shaft member, and the attachment portion and the one of the first and second shaft portions of which the peripheral surface is formed as the circular peripheral surface centered on the rotation axis of the attachment portion may be formed in columnar shapes that are centered on the rotation axis and that have the same diameter. In such a case, processing can be facilitated. In addition, the attachment portion may be provided between the first and second shaft portions in the adjusting shaft member, and the peripheral surface of at least one of the first and second shaft portions may be formed such that a distance from the rotation axis to the peripheral surface is smaller than or equal to a distance from the rotation axis to the peripheral surface of the attachment portion. In such a case, the adjusting shaft member can be easily attached to the support plate. In addition, the adjusting shaft member may be formed such that the attachment portion is at one end of the adjusting shaft member along the axial direction and one of the first and second shaft portions is at the other end of the adjusting shaft member along the axial direction.

In addition, in the focal plane shutter of the camera according to the aspect of the present invention, the printed wiring board may be a rigid printed wiring board, and the adjusting shaft member may be attached to the printed wiring board. Alternatively, the printed wiring board may be a flexible printed wiring board, and an accessory plate may be stacked between the flexible printed wiring board and the support plate. In this case, the adjusting shaft member may be attached to the accessory plate.

In addition, the contact portion and the positioning portion of at least one of the first and second contact members may be disposed with a predetermined gap therebetween in an operating direction of the contact portion and the positioning portion. In such a case, powder generated when the positioning portion comes into contact with the adjusting shaft member does not easily adhere to the contact member.

As described above, in the focal plane shutter according to the present invention, the two contact members, which can be used to emit flashlight or detect a malfunction of the driving member, include the positioning portions at positions near the free ends thereof. When the shutter is in the set state, the positioning portions are individually brought into contact with the circular peripheral surface and the cam surface of the adjusting shaft member by the elasticity of the contact members. The two contact members also include the contact portions at positions near the free ends thereof, and a distance between the contact portions can be changed by rotating the adjusting shaft member. Therefore, the individual-difference correcting process can be easily performed even by an unskilled worker at the final phase of assembly.

BRIEF DESCRIPTION OF THE DRAWINGS

FIGS. 10A to 10F illustrate six modifications of the adjusting shaft member of the embodiment, where

DESCRIPTION OF THE PREFERRED EMBODIMENTS

A focal plane shutter according to an embodiment of the present invention will be described with reference to the drawings. The focal plane shutter includes two shutter blade groups, as described in Patent Documents 1 to 3. First, the embodiment will be described, and modifications of an adjusting shaft member included in a switch mechanism according to the embodiment will be explained. Then, it will be described that the switch mechanism can also be used as a mechanism for detecting a malfunction of driving members in a focal plane shutter with a single shutter blade group.

Figure 1:
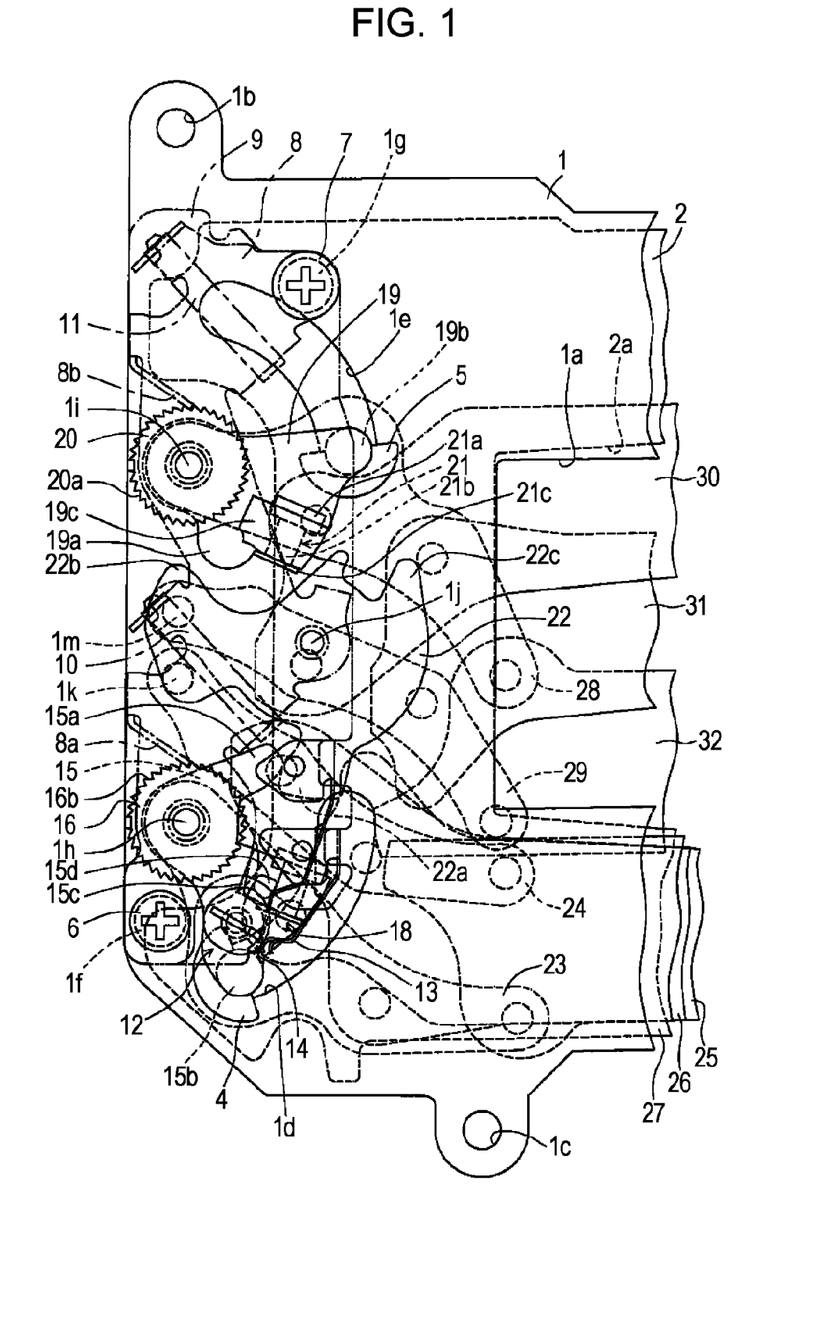
FIG. 1 is a plan view of about one-half on the left side of the structure according to an embodiment viewed from a taking lens when the structure is installed in a camera, and illustrates the state immediately after the completion of an exposure process.
Figure 2:
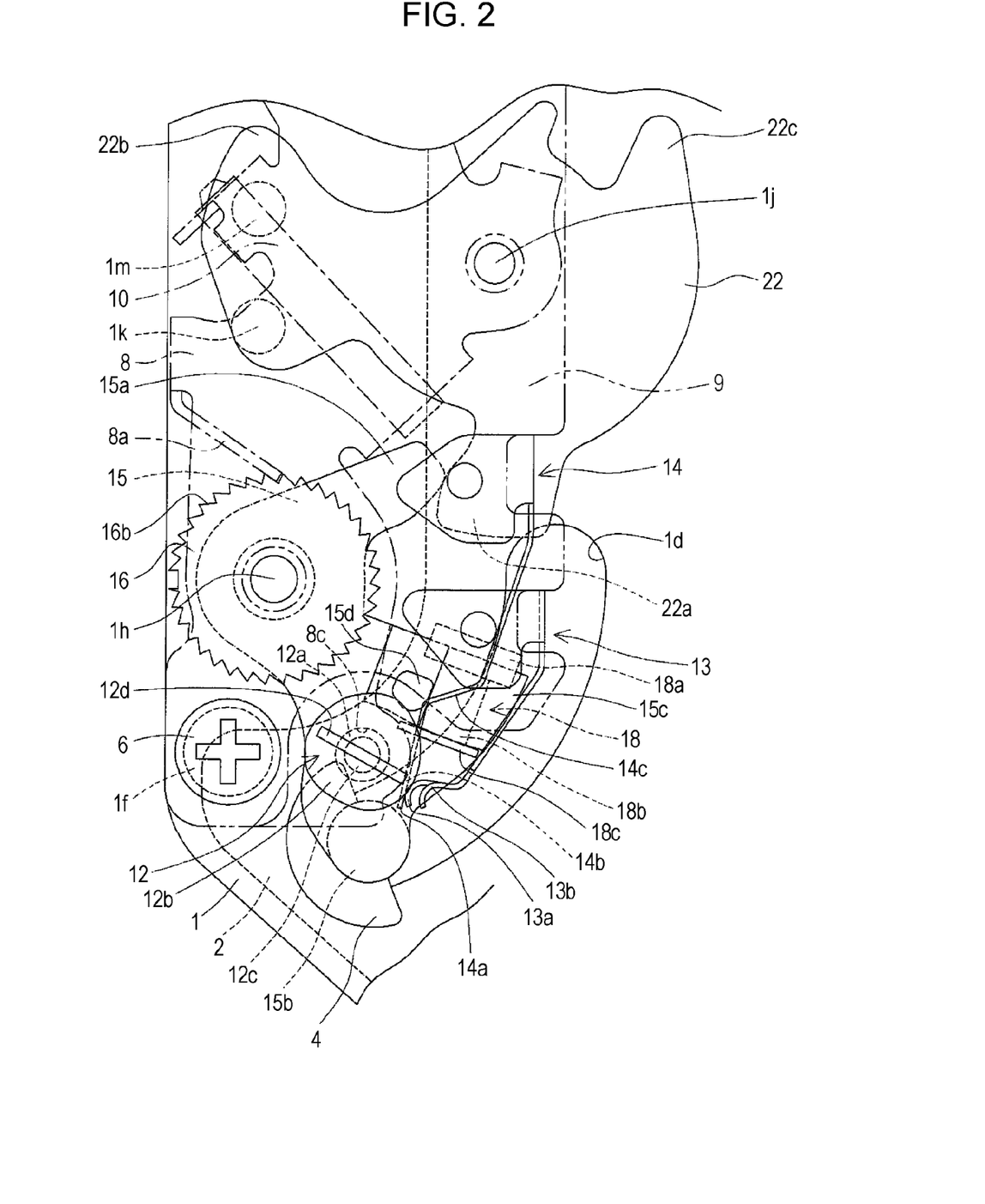
FIG. 2 is an enlarged plan view of the main part of FIG. 1.
Figure 3:
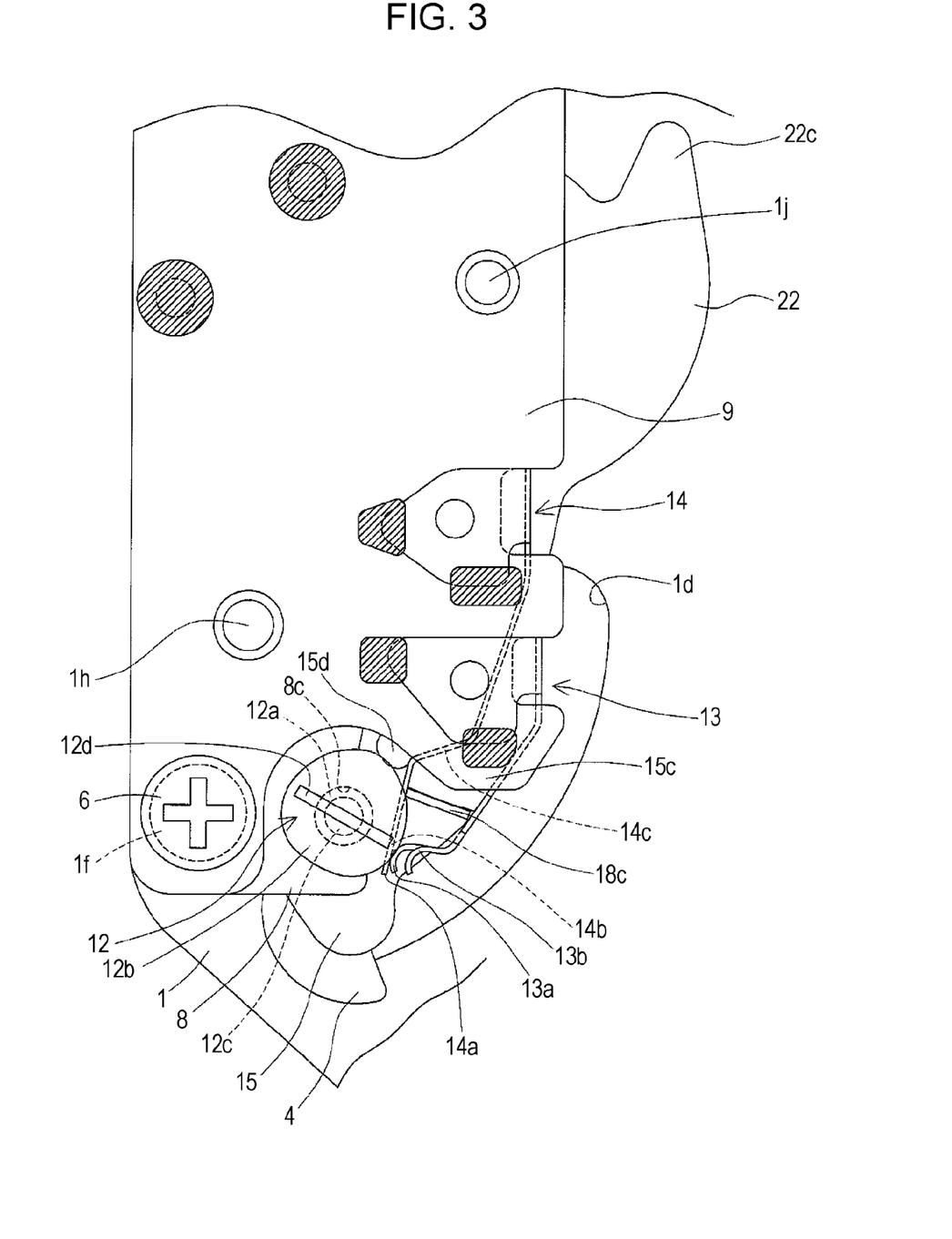
FIG. 3 is a plan view corresponding to FIG. 2, where components drawn by imaginary lines in FIG. 2 are drawn by solid lines.
Figure 4:
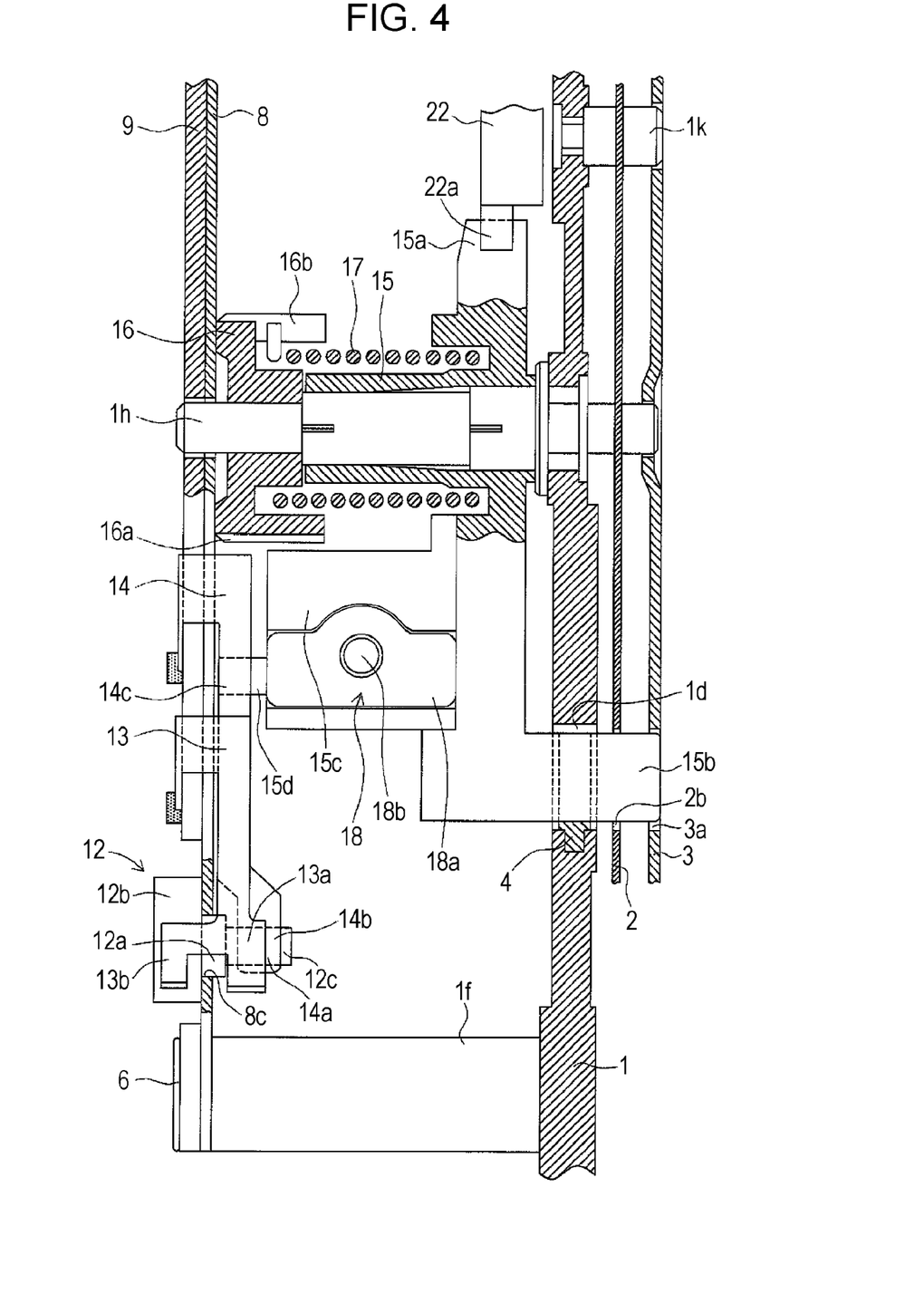
FIG. 4 is a partially sectioned side view viewed from the right in FIG. 3.
Figure 5A:
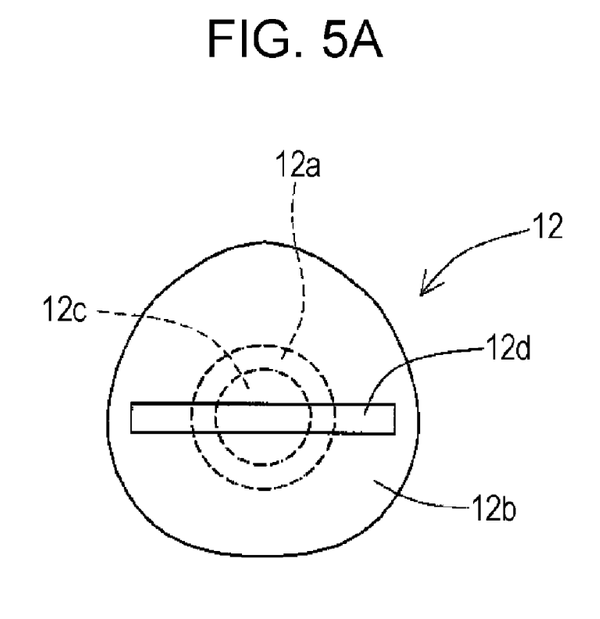
FIG. 5A is a plan view of an adjusting shaft member according to the embodiment.
Figure 5B:
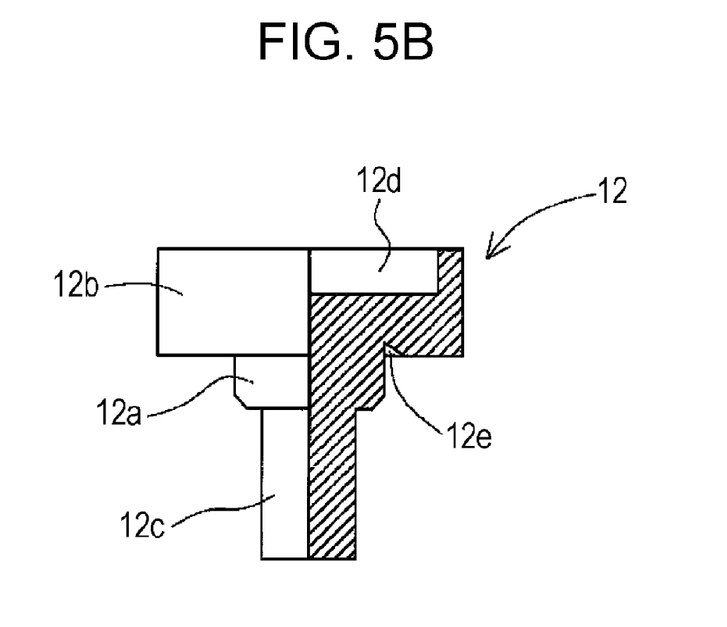
FIG. 5B is a partially sectioned side view of the adjusting shaft member in which the right half of the adjusting shaft member is sectioned.

The structure of the embodiment will be described with reference to FIGS. 1 to 5B. As described above, FIG. 1 is a plan view of about one-half on the left side of the structure viewed from a taking lens when the structure is installed in a camera, and illustrates the state immediately after the completion of an exposure process. FIG. 2 is an enlarged plan view of FIG. 1, where the main part of FIG. 1 is enlarged to facilitate understanding. In FIGS. 1 and 2, only the outlines of a support plate and a printed wiring board, which will be described below, are shown by one-dot chain lines and two-dot chain lines, respectively, to facilitate understanding of the main part. FIG. 3 is a diagram corresponding to FIG. 2, where the support plate and the printed wiring board are shown by solid lines. FIG. 4 is a partially sectioned side view viewed from the right in FIG. 3, where some of the components are sectioned. FIG. 5A is a plan view of the adjusting shaft member included in the switch mechanism according to the embodiment, and FIG. 5B is a partially sectioned side view of the adjusting shaft member in which the right half of the adjusting shaft member is sectioned.

A shutter base plate 1 according to the present embodiment is formed of a synthetic resin. Similar to a well-known structure, the shutter base plate 1 has a rectangular outline and is provided with a plurality of attachment holes for attaching the shutter base plate 1 to a camera body. FIG. 1 illustrates about one-half on the left side of the shutter base plate 1 when viewed from a taking lens, that is, from the object side. Therefore, only a left part of a rectangular opening 1a for an imaging optical path, which is provided at a central section, and only two attachment holes 1b and 1c for attaching the shutter base plate 1 to the camera body are illustrated.

An intermediate plate 2 and an auxiliary base plate 3 are provided in that order behind the shutter base plate 1 with predetermined intervals therebetween. A blade chamber for a front blade group is defined between the shutter base plate 1 and the intermediate plate 2, and a blade chamber for a rear blade group is defined between the intermediate plate 2 and the auxiliary base plate 3. The auxiliary base plate 3 is illustrated only in FIG. 4. Each of the intermediate plate 2 and the auxiliary base plate 3 has an opening at a position corresponding to the opening 1a in the shutter base plate 1. Each of the openings has a shape different from that of the opening 1a and is slightly larger than the opening 1a. In FIG. 1, only a part of an opening 2a formed in the intermediate plate 2 is illustrated.

The shutter base plate 1 has two arc-shaped long holes 1d and 1e at the left side of the opening 1a. Buffer members 4 and 5 made of well-known rubber that are C-shaped in a plan view are provided at the bottom ends of the long holes 1d and 1e, respectively, in the longitudinal direction. Long holes having shapes similar to those of the long holes 1d and 1e are formed in each of the intermediate plate 2 and the auxiliary base plate 3 at positions corresponding to the long holes 1d and 1e. However, in FIG. 4, only long holes 2b and 3a formed in the intermediate plate 2 and the auxiliary base plate 3, respectively, at a position corresponding to the long hole 1d are illustrated.

Shafts 1f, 1g, 1h, 1i, 1j, 1k, and 1m are provided on the shutter base plate 1. The shafts 1f, 1g, and 1j are provided on a front side (side that faces the taking lens) of the shutter base plate 1, and the shafts 1k and 1m are provided on a rear side of the shutter base plate 1. The shafts 1h and 1i extend through the shutter base plate 1 so as to project from both the front and rear sides thereof. Ends of the shafts 1k and 1m are inserted into holes formed in the auxiliary base plate 3. FIG. 4 illustrates the shaft 1k in such a state. Ends of the shafts 1h and 1i at the rear side of the shutter base plate 1 are also inserted into holes formed in the auxiliary base plate 3. FIG. 4 illustrates the shaft 1h in such a state.

A support plate 8 and a printed wiring board 9 are stacked together and attached with screws 6 and 7 to ends of the shafts 1f and 1g, which are provided at the front side of the shutter base plate 1. In FIGS. 1 and 2, the outline of the support plate 8 disposed so as to face the shutter base plate 1 is shown by one-dot chain lines, and the outline of the printed wiring board 9 disposed so as to face the taking lens is shown by two-dot chain lines. Ends of the shafts 1h and 1i at the front side and an end of the shaft 1j are inserted into holes formed in both the support plate 8 and the printed wiring board 9. FIG. 4 illustrates the state in which the end of the shaft 1h at the front side is inserted into the holes formed in both the support plate 8 and the printed wiring board 9.

The support plate 8 may be formed of a synthetic resin. However, in the present embodiment, the support plate 8 is formed of a metal, and has a complex shape with a plurality of bent portions. The basic shape of the support plate 8 is similar to that of a well-known structure. Although detailed description will be omitted here, the support plate 8 includes two ratchet pawl portions 8a and 8b that are formed by bending portions of the support plate 8 toward the shutter base plate 1 and then bending ends of the bent portions toward the opening 1a. A front-blade electromagnet and a rear-blade electromagnet are attached to the support plate 8 at the side that faces the shutter base plate 1. Similar to a well-known structure, each of the electromagnets includes an angular-U shaped iron core having two magnetic pole portions and a coil wound around one of the two magnetic pole portions, and is attached to the support plate 8 such that the two magnetic pole portions are aligned in a direction perpendicular to the shutter base plate 1. In FIG. 1, only iron cores 10 and 11 are shown by one-dot chain lines, similar to the support plate 8. In FIG. 2, only the iron core 10 of the front-blade electromagnet is illustrated in a similar manner.

An attachment hole 8c (reference numeral 8c is omitted in FIGS. 1, 6, and 7) is formed in the support plate 8, and an adjusting shaft member 12 is attached to the attachment hole 8c. As described above, in the present embodiment, the adjusting shaft member 12 is attached to the support plate 8. However, since the printed wiring board 9 is a rigid printed wiring board in the present embodiment, the adjusting shaft member 12 may instead be attached to the printed wiring board 9 in a manner similar to the case in which the adjusting shaft member 12 is attached to the support plate 8.

The adjusting shaft member 12 according to the present embodiment is formed of an insulating synthetic resin. As illustrated in FIG. 5, the adjusting shaft member 12 includes a first shaft portion 12b, a second shaft portion 12c, and an attachment portion 12a interposed therebetween. The attachment portion 12a has a circular peripheral surface, and the center of the circular peripheral surface serves as a rotation axis of the adjusting shaft member 12. The attachment portion 12a is press-fitted to the attachment hole 8c in the support plate 8. The peripheral surface of the first shaft portion 12b is formed as a cam surface such that the distance from the rotation axis of the adjusting shaft member 12 to the cam surface varies. The distance from the rotation axis to the cam surface is larger than the radius of the attachment portion 12a. The first shaft portion 12b has a linear groove 12d formed in a flat portion that defines an end face of the adjusting shaft member 12 at one end thereof. The first shaft portion 12b also has an annular groove 12e formed along an area adjacent to the attachment portion 12a. The second shaft portion 12c has a circular peripheral surface that is centered on the rotation axis of the adjusting shaft member 12. The diameter of the second shaft portion 12c is smaller than that of the attachment portion 12a.

When the attachment portion 12a of the adjusting shaft member 12 is press-fitted to the attachment hole 8c in the support plate 8, abrasion powder generated by the press-fitting process and small dust on the peripheral surface of the attachment portion 12a and the inner surface of the attachment hole 8c are pushed into the annular groove 12e. After the press-fitting process, a gap between two contact members 13 and 14, which will be described below, is adjusted, and then the adjusting shaft member 12 is fixed to the support plate 8 with an adhesive. To facilitate visualization, the groove 12e in the adjusting shaft member 12 and reference numeral 12e are omitted in FIGS. 1 to 4, 6, 7, 8, and 9, and the reference numerals of other portions of the adjusting shaft member 12 are omitted in FIGS. 1, 6, and 7.

The printed wiring board 9 according to the present embodiment is manufactured using a glass epoxy copper clad laminate. Although the printed wiring board 9 has a wiring pattern at the side that faces the taking lens, the wiring pattern is not illustrated in FIG. 3. Two terminal pins of the coil included in the front-blade electromagnet (not shown) and two terminal pins of the coil included in the rear-blade electromagnet (not shown) are soldered to the printed wiring board 9. In FIG. 3, soldered sections where the two terminal pins of the coil in the front-blade electromagnet are soldered are shown by shaded circular areas in an upper left section.

As clearly illustrated in FIGS. 3 and 4, two flexible contact members 13 and 14 made of phosphor bronze are attached to the printed wiring board 9. The first contact member 13 is soldered to the printed wiring board 9 at two positions (shaded areas in FIG. 3) at one end thereof, and has a free end at the other end thereof. The free end of the first contact member 13 is branched into two end portions, one of which functions as a contact portion 13a and the other one of which functions as a positioning portion 13b. As is clear from FIG. 4, the contact portion 13a is closer to the shutter base plate 1 than the support plate 8, and the positioning portion 13b is closer to the taking lens than the printed wiring board 9.

In addition, as is clear from FIG. 3, the first contact member 13 is formed such that the contact portion 13a is closer to the adjusting shaft member 12 than the positioning portion 13b, and has a function of bringing the positioning portion 13b into contact with the cam surface of the first shaft portion 12b of the adjusting shaft member 12 by an elastic restoring force thereof. Although the contact portion 13a is closer to the adjusting shaft member 12 than the positioning portion 13b in the present embodiment, the present invention is not limited to this.

The second contact member 14 is soldered to the printed wiring board 9 at two positions (shaded areas in FIG. 3) at one end thereof, and has a free end at the other end thereof. Two adjacent portions of the second contact member 14 that are near the free end thereof serve as a contact portion 14a and a positioning portion 14b. The second contact member 14 includes a pushing portion 14c formed by bending the second contact member 14 at a central section thereof in the longitudinal direction. The second contact member 14 has a function of bringing the positioning portion 14b into contact with the circular peripheral surface of the second shaft portion 12c of the adjusting shaft member 12 by an elastic restoring force thereof. To facilitate visualization, reference numerals of components of the two contact members 13 and 14 are omitted in FIGS. 1, 6, and 7. Circular holes are formed in the contact members 13 and 14 in areas at which the contact members 13 and 14 are attached to the printed wiring board 9. Pins of jigs are fitted to the holes when the contact members 13 and 14 are soldered to the printed wiring board 9. Similar holes are also formed in the printed wiring board 9 at the corresponding positions.

In the present embodiment, the rigid printed wiring board 9 is stacked on the support plate 8. However, a flexible printed wiring board may be used in place of the rigid printed wiring board 9. In such a case, the stability of attachment of the two contact members 13 and 14 cannot be ensured if the contact members 13 and 14 are simply attached to the flexible printed wiring board at one end thereof. If the contact members 13 and 14 are attached to the flexible printed wiring board in an area where the flexible printed wiring board and the support plate 8 completely overlap, the stability of attachment of the contact members 13 and 14 can be ensured. However, this is not preferable in the present embodiment since the support plate 8 is made of a metal and there is a risk that the contact members 13 and 14 will come into contact with the support plate 8. Therefore, in the case where the flexible printed wiring board is used, preferably, an insulating accessory plate is interposed between the flexible printed wiring board and the support plate 8 and the contact members 13 and 14 are attached to the flexible printed wiring board in an area where only the flexible printed wiring board and the accessory plate overlap.

Components provided between the shutter base plate 1 and the support plate 8 and attached to the shafts 1h, 1i, and 1j provided on the shutter base plate 1 will now be described. As illustrated in FIG. 4, a front-blade driving member 15 and a ratchet wheel 16 are rotatably attached to the shaft 1h on the shutter base plate 1. As illustrated in FIGS. 1 and 2, an end of the above-described ratchet pawl portion 8a provided on the support plate 8 is engaged with ratchet teeth 16a formed along the periphery of the ratchet wheel 16.

As illustrated only in FIG. 4, a front-blade driving spring 17 is attached to a spring hook portion (not shown) of the front-blade driving member 15 at one end thereof, and is attached to a slit-shaped spring hook portion 16b formed in the ratchet wheel 16 at the other end thereof. As illustrated in FIGS. 1 and 2, counterclockwise rotation of the ratchet wheel 16 is restrained by the ratchet pawl portion 8a. Therefore, the front-blade driving spring 17 urges the front-blade driving member 15 in the clockwise direction. As is well known, the urging force applied by the front-blade driving spring 17 can be adjusted by changing the engagement position between the ratchet pawl portion 8a and the ratchet teeth 16a.

The front-blade driving member 15 is formed of a synthetic resin, and includes a pushing portion 15a, a driving pin 15b, and an attachment portion 15c, as clearly illustrated in FIG. 2. The driving pin 15b is disposed so as to extend through the long hole 1d in the shutter base plate 1 and the long hole 2b in the intermediate plate 2, and an end of the driving pin 15b is inserted into the long hole 3a in the auxiliary base plate 3. The attachment portion 15c is thick in a direction toward the support plate 8. A pushing portion 15d is provided on an outer surface of the attachment portion 15c that faces the support plate 8, and an iron member 18 is disposed in the attachment portion 15c.

Similar to a well-known structure, the iron member 18 includes an iron piece 18a that comes into contact with the two magnetic pole portions of the iron core 10 in the above-described front-blade electromagnet and that is attracted to and retained by the magnetic pole portions. The iron member 18 also includes a shaft portion 18b and a head portion 18c. The iron member 18 is urged by an urging force applied by a compression spring (not shown) in a direction such that the iron piece 18a is pushed out of the attachment portion 15c from the inside. Therefore, in the state shown in FIG. 2, the head portion 18c, which is positioned outside the attachment portion 15c, is pressed against a side surface of the attachment portion 15c by the urging force, so that the iron piece 18a largely projects outward from the attachment portion 15c. To facilitate visualization, reference numerals of the components of the iron member 18 are omitted in FIGS. 1, 6, and 7.

Similar to the above-described front-blade driving member 15 and the ratchet wheel 16, a rear-blade driving member 19 and a ratchet wheel 20 are rotatably attached to the shaft 1i of the shutter base plate 1, as illustrated in FIG. 1. An end of the above-described ratchet pawl portion 8b provided on the support plate 8 is engaged with ratchet teeth 20a formed along the periphery of the ratchet wheel 20. In addition, similar to the above-described front-blade driving spring 17, a rear-blade driving spring (not shown) is attached to a spring hook portion of the rear-blade driving member 19 at one end thereof, and is attached to a spring hook portion of the ratchet wheel 20 at the other end thereof, so that the rear-blade driving member 19 is urged in the clockwise direction.

The rear-blade driving member 19 is formed of a synthetic resin, and includes a pushing portion 19a, a driving pin 19b, and an attachment portion 19c. The driving pin 19b is disposed so as to extend through the long hole 1e in the shutter base plate 1 and a long hole (not shown) in the intermediate plate 2, and an end of the driving pin 19b is inserted into a long hole (not shown) in the auxiliary base plate 3. The attachment portion 19c is thick in a direction toward the support plate 8, and an iron member 21 is disposed in the attachment portion 19c.

The iron member 21 includes an iron piece 21a that comes into contact with the two magnetic pole portions of the iron core 11 in the above-described rear-blade electromagnet and that is attracted to and retained by the magnetic pole portions. The iron member 21 also includes a shaft portion 21b and a head portion 21c. The iron member 21 is urged by an urging force applied by a compression spring (not shown) in a direction such that the iron piece 21a is pushed out of the attachment portion 19c from the inside. Therefore, in the state shown in FIG. 2, the head portion 21c, which is positioned outside the attachment portion 19c, is pressed against a side surface of the attachment portion 19c by the urging force, so that the iron piece 21a largely projects outward from the attachment portion 19c.

As illustrated in FIGS. 1 and 2, a setting member 22 formed of a synthetic resin is rotatably attached to the shaft 1j of the shutter base plate 1. The setting member 22 includes a pushing portion 22a that pushes the pushing portion 15a of the front-blade driving member 15, a pushing portion 22b that pushes the pushing portion 19a of the rear-blade driving member 19, and a pushing portion 22c that is pushed by a member included in the camera body (not shown), and is urged counterclockwise by a return spring (not shown). FIGS. 1 and 2 illustrate the state in which the setting member 22 has been rotated counterclockwise by an urging force applied by the return spring (not shown) and stopped by a stopper (not shown) at an initial position.

The structures of the front and rear blade groups disposed in the two blade chambers behind the shutter base plate 1 will now be described. First, the front blade group disposed between the shutter base plate 1 and the intermediate plate 2 will be described. In the present embodiment, the front blade group includes two oblong arms 23 and 24 and three blades 25, 26, and 27. The arm 23 is rotatably attached to the above-described shaft 1h at one end thereof, and has a free end at the other end thereof. The above-described driving pin 15b is fitted to a well-known hole (not shown) formed in the arm 23. Therefore, the arm 23 is reciprocated together with the front-blade driving member 15 by the front-blade driving member 15. The other arm 24 is rotatably attached to the above-described shaft 1k at one end thereof, and has a free end at the other end thereof. The three blades 25, 26, and 27 are provided on the two arms 23 and 24 in that order from the attached ends to the free ends, and are supported by well-known connecting shaft members in a pivotable manner. The blade 27 functions as a slit-forming blade in the front blade group.

The rear blade group disposed between the intermediate plate 2 and the auxiliary base plate 3 includes two oblong arms 28 and 29 and three blades 30, 31, and 32. The arm 28 is rotatably attached to the above-described shaft 1i at one end thereof, and has a free end at the other end thereof. The above-described driving pin 19b is fitted to a well-known hole (not shown) formed in the arm 28. Therefore, the arm 28 is reciprocated together with the rear-blade driving member 19 by the rear-blade driving member 19. The other arm 29 is rotatably attached to the above-described shaft 1m at one end thereof, and has a free end at the other end thereof. The three blades 30, 31, and 32 are provided on the two arms 28 and 29 in that order from the attached ends to the free ends, and are supported by well-known connecting shaft members in a pivotable manner. The blade 32 functions as a slit-forming blade in the rear blade group. In FIG. 4, the front and rear blade groups are not illustrated.

The operation of the present embodiment will be described with reference to FIGS. 1, 2, 6, and 7. As described above, FIGS. 1 and 2 illustrate the state immediately after the completion of an exposure process. In this state, the setting member 22 is at the initial position. The driving pins 15b and 19b of the front-blade driving member 15 and the rear-blade driving member 19 are in contact with the buffer members 4 and 5, respectively, so that the front-blade driving member 15 and the rear-blade driving member 19 are restrained from rotating clockwise. Accordingly, the three blades 25 to 27 in the front blade group are set to a stacked state in which the blades 25 to 27 largely overlap and are stored in a section below the opening 1a, while the three blades 30 to 32 in the rear blade group are in a deployed state in which the three blades 30 to 32 overlap by a small amount and cover the opening 1a.

In addition, as illustrated in FIG. 2, the pushing portion 14c of the second contact member 14 is pushed by the pushing portion 15d of the front-blade driving member 15 by a maximum amount, so that the second contact member 14 is largely bent. Accordingly, the positioning portion 14b of the second contact member 14 is separated from the second shaft portion 12c of the adjusting shaft member 12 by a large amount. Therefore, the contact portion 13a of the first contact member 13 is pushed by the contact portion 14a of the second contact member 14, so that the positioning portion 13b is separated from the first shaft portion 12b of the adjusting shaft member 12.

A shutter setting operation is performed when the member in the camera body (not shown) pushes the pushing portion 22c of the setting member 22 in the state shown in FIGS. 1 and 2 so as to rotate the setting member 22 clockwise against the urging force applied by the return spring (not shown). When the setting member 22 is rotated in such a manner, the pushing portion 22a pushes the pushing portion 15a of the front-blade driving member 15, so that the front-blade driving member 15 is rotated counterclockwise against the urging force applied by the front-blade driving spring 17 (see FIG. 4).

Accordingly, the arm 23 in the front blade group is rotated counterclockwise by the driving pin 15b of the front-blade driving member 15. Therefore, the three blades 25 to 27 in the front blade group move upward while maintaining the horizontal orientation thereof and reducing the overlapping areas therebetween. In addition, the pushing portion 15d of the front-blade driving member 15 moves away from the pushing portion 14c of the second contact member 14. Accordingly, the two contact members 13 and 14 are moved by the elastic restoring forces thereof such that the positioning portion 13b of the first contact member 13 approaches the first shaft portion 12b of the adjusting shaft member 12 and the positioning portion 14b of the second contact member 14 approaches the second shaft portion 12c of the adjusting shaft member 12.

Then, when an overlapping area between the blade 27 that functions as a slit-forming blade in the front blade group and the blade 32 that functions as a slit-forming blade in the rear blade group reaches a predetermined area, the pushing portion 22b of the setting member 22 pushes the pushing portion 19a of the rear-blade driving member 19. Accordingly, the rear-blade driving member 19 starts to rotate counterclockwise against the urging force applied by the rear-blade driving spring (not shown). Accordingly, the arm 28 in the rear blade group is rotated counterclockwise by the driving pin 19b of the rear-blade driving member 19. Therefore, the three blades 30 to 32 in the rear blade group move upward while maintaining the horizontal orientation thereof and increasing the overlapping areas therebetween.

In this stage, the two contact members 13 and 14, which have been following the movement of the pushing portion 15d of the front-blade driving member 15, successively stop. More specifically, first, the positioning portion 13b comes into contact with the peripheral surface of the first shaft portion 12b of the adjusting shaft member 12, and the first contact member 13 stops. At this time, there is a possibility that small abrasion powder will be generated as a result of the contact. However, as is clear from FIG. 2, in the present embodiment, the contact portion 13a is positioned closer to the adjusting shaft member 12 than the positioning portion 13b. Therefore, the abrasion powder does not adhere to the contact portion 13a, and the contact failure does not occur between the contact portion 13a and the contact portion 14a of the second contact member 14 in a shooting operation, which will be described below. The second contact member 14 continuously follows the movement of the pushing portion 15d of the front-blade driving member 15 after the first contact member 13 has stopped, and accordingly the contact portion 14a moves away from the contact portion 13a of the first contact member 13. The second contact member 14 stops when the positioning portion 14b comes into contact with the peripheral surface of the second shaft portion 12c of the adjusting shaft member 12.

The front and rear blade groups are continuously operated by the driving members 15 and 19, respectively, even after the two contact members 13 and 14 have stopped. Accordingly, the three blades 30 to 32 in the rear blade group are set to a stacked state in which the blades 30 to 32 largely overlap and are stored in a section above the opening 1a, while the three blades 25 to 27 in the front blade group are set to a deployed state in which the three blades 25 to 27 overlap by a small amount and cover the opening 1a. In this state, the iron pieces 18a and 21a in the iron members 18 and 21 attached to the two driving members 15 and 19 successively come into contact with the iron cores 10 and 11, respectively.

Figure 6:
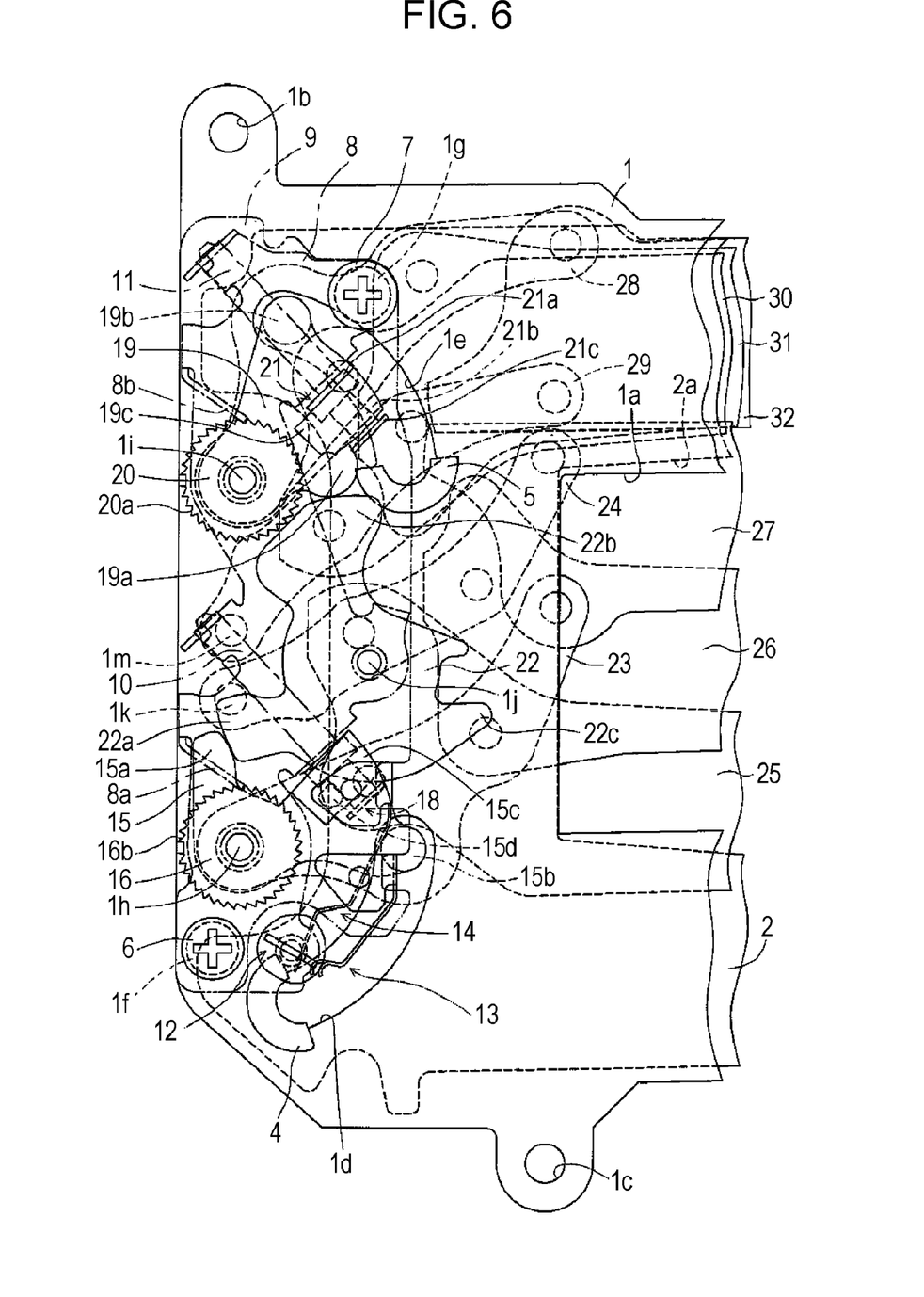
FIG. 6 is a plan view of the structure according to the embodiment illustrated in FIG. 1 in a set state.

Therefore, the iron members 18 and 21 cannot move further together with the driving members 15 and 19. However, the setting member 22 does not stop at this time, but stops after slightly rotating the two driving members 15 and 19 while compressing the above-described compression springs (not shown) that urge the iron members 18 and 21. Then, the setting member 22 maintains this state until the shooting operation is performed. This state is referred to as the set state, which is illustrated in FIG. 6. In this state, the head portions 18c and 21c of the iron members 18 and 21 are separated from the attachment portions 15c and 19c of the driving members 15 and 19, respectively, so that the shaft portions 18b and 21b are partially exposed.

The shooting operation will now be described. When a release button of the camera is pressed in the state illustrated in FIG. 6, first, electricity is supplied to the coils in the front-blade electromagnet and the rear-blade electromagnet (not shown), so that the iron members 18 and 21 are attracted to and retained by the iron cores 10 and 11, respectively. Immediately after that, the member in the camera body (not shown) is moved away from the pushing portion 22c of the setting member 22. Therefore, the setting member 22 is rotated counterclockwise by the urging force of the return spring (not shown), and is stopped when the setting member 22 comes into contact with the stopper (not shown) at the initial position.

Figure 7:
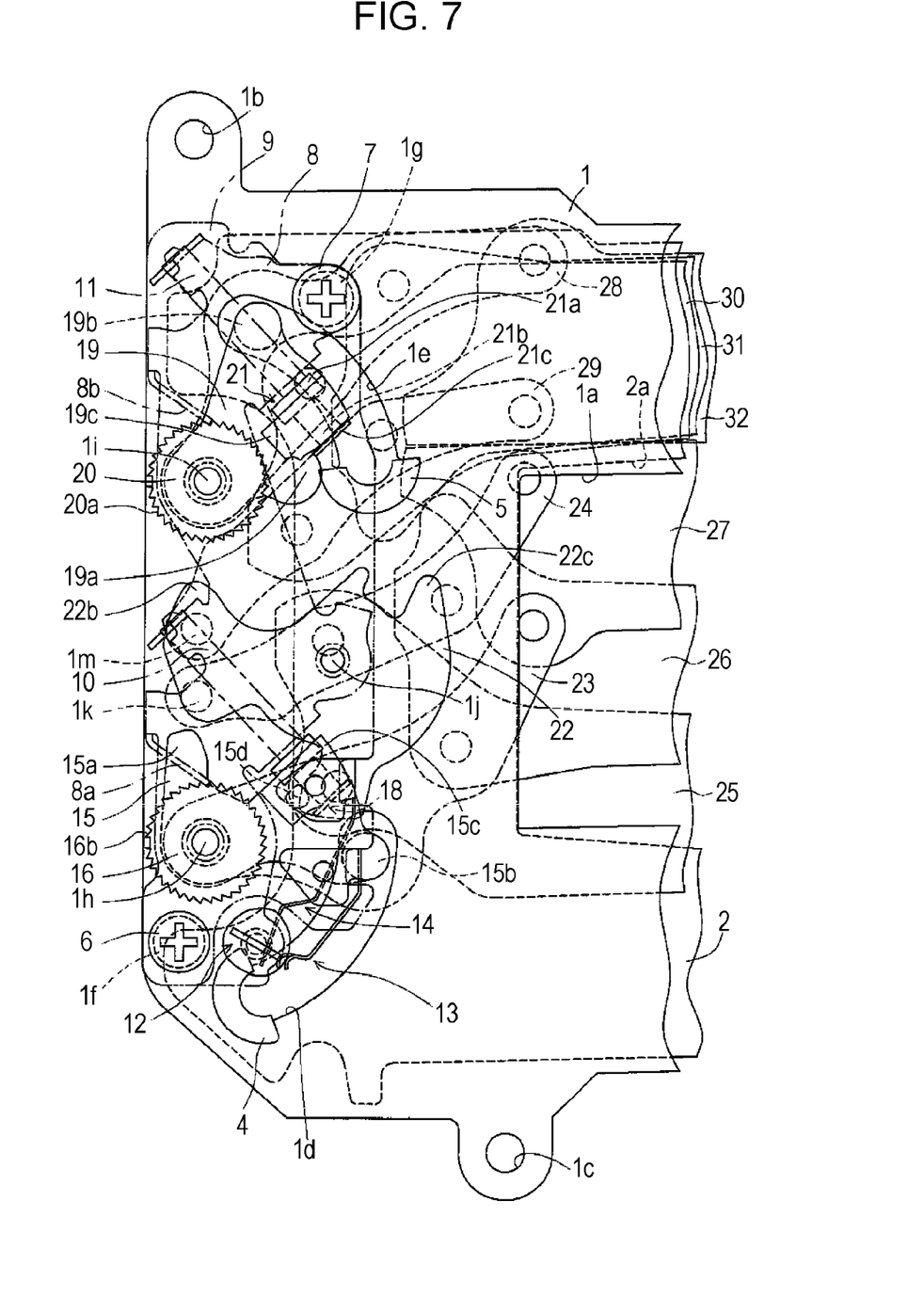
FIG. 7 is a plan view corresponding to FIG. 1, illustrating the structure according to the embodiment in a state immediately before the start of the exposure process in a shooting operation.

While the setting member 22 is returning to the initial position, the pushing portions 22a and 22b of the setting member 22 move away from the pushing portions 15a and 19a of the driving members 15 and 19, respectively. Therefore, the front-blade driving member 15 is rotated clockwise by the urging force of the front-blade driving spring 17 and the urging force of the compression spring (not shown) compressed in the final stage of the setting operation. The rear-blade driving member 19 is also rotated clockwise by the urging force of the rear-blade driving spring (not shown) and the urging force of the compression spring (not shown) compressed in the final stage of the setting operation. However, the rotations of the driving members 15 and 19 are immediately stopped when the attachment portions 15c and 19c come into contact with the head portions 18c and 21c of the iron members 18 and 21, respectively. FIG. 7 illustrates the state in which the driving members 15 and 19 are stopped. The positions of the driving members 15 and 19 and the front and rear blade groups in this state are exposure-process starting positions thereof.

When the state illustrated in FIG. 7 is established, the electricity supplied to the coil in the front-blade electromagnet and the electricity supplied to the coil in the rear-blade electromagnet are successively tuned off. Accordingly, the front-blade driving member 15 and the rear-blade driving member 19 successively starts the exposure process together with the front blade group and the rear blade group, respectively. As is well known, in general, an operation of closing the opening 1a with the rear blade group is often started before the opening 1a is fully opened by the front blade group. However, in the following description, a shooting operation in a flash mode in which the closing operation is performed by the rear blade group after the opening 1a is fully opened by the front blade group will be explained.

After the state illustrated in FIG. 7 is established, first, the electricity supplied to the coil in the front-blade electromagnet is turned off. Accordingly, the attractive force applied to the iron member 18 by the iron core 10 is eliminated, so that the front-blade driving member 15 is quickly rotated clockwise by the urging force of the front-blade driving spring 17. Therefore, the arm 23 in the front blade group is rotated clockwise by the driving pin 15b, and the three blades 25 to 27 in the front blade group move downward while increasing the overlapping areas therebetween, thereby opening the opening 1a from the top toward the bottom.

Then, immediately before the opening 1a is fully opened by the front blade group, the pushing portion 15d of the front-blade driving member 15 pushes the pushing portion 14c of the second contact member 14. Accordingly, the positioning portion 14b is moved away from the second shaft portion 12c of the adjusting shaft member 12 and the contact portion 14a is brought into contact with the contact portion 13a of the first contact member 13. Then, the pushing portion 15d further pushes the pushing portion 14c of the second contact member 14, so that the contact portion 14a of the second contact member 14 pushes the contact portion 13a of the first contact member 13 and the positioning portion 13b of the first contact member 13 is moved away from the first shaft portion 12b of the adjusting shaft member 12.

When the two contact portions 13a and 14a come into contact with each other, flashlight is emitted. Before the flashlight is emitted, the driving pin 15b comes into contact with the buffer member 4 so that the front-blade driving member 15 is stopped, and the three blades 25 to 27 in the front blade group are set to a stacked state and stored in a section below the opening 1a. Therefore, the flashlight is emitted when the opening 1a is fully open, and uneven exposure does not occur.

After the flashlight is emitted in the above-described manner, the electricity supplied to the coil in the rear-blade electromagnet is turned off. Accordingly, the rear-blade driving member 19 is rotated clockwise by the urging force applied by the rear-blade driving spring (not shown). Therefore, the arm 28 in the rear blade group is rotated clockwise by the driving pin 19b, and the three blades 30 to 32 in the rear blade group move downward while reducing the overlapping areas therebetween, thereby closing the opening la from the top toward the bottom. Then, immediately after the three blades 30 to 32 are set to a deployed state in which the opening 1a is fully closed, the driving pin 19b comes into contact with the buffer member 5 so that the rotation of the rear-blade driving member 19 is stopped. Accordingly, the operation of the rear blade group is also stopped. This state is illustrated in FIGS. 1 and 2.

In the above-described operation, the switch mechanism according to the present embodiment is used as a flash synchronization switch. However, a control circuit may instead be designed such that the switch mechanism is used to detect a malfunction of the front-blade driving member 15, as described in Patent Document 2. For example, in the case where the battery is low and the iron member 18 cannot be attracted to and retained by the iron core 10 in the state shown in FIG. 6, the front-blade driving member 15 starts to rotate before a predetermined time. In such a case, the two contact portions 13a and 14a come into each other before a predetermined time. Therefore, irrespective of whether or not the operation mode of the shooting operation is the flash mode, when the release button is pressed, the two contact portions 13a and 14a come into contact with each other before the predetermined time. Accordingly, a user can recognize that a malfunction has occurred.

As is well known, it is necessary to emit the flashlight within an extremely short time after the opening 1a is fully opened by the front blade group and before the rear blade group starts to close the opening 1a. Therefore, the time at which the contact portions 13a and 14a of the two contact members 13 and 14 come into contact with each other is extremely important. However, as described above, there is a possibility that the time of contact between the contact portions 13a and 14a is shifted due to individual differences between components caused in the manufacturing process. According to the related art, the positioning portions of the two contact members are brought into contact with a printed wiring board. Therefore, to correct the shift in the time of contact after the assembly, it is necessary to make an adjustment by causing plastic deformation of at least one of the contact members 13 and 14 using a pair of tweezers or the like. However, such an adjustment is difficult because of the positions at which the contact members 13 and 14 are attached. In addition, the process of deforming the contact members cannot be repeated many times in consideration of the characteristics of the contact members, and therefore skills are required to perform such an adjustment.

However, according to the present embodiment, the adjustment can be easily performed. The adjustment method according to the present embodiment will be described with reference to FIGS. 8 and 9, which illustrate the shutter in the set state. As described above, according to the present embodiment, the attachment portion 12a of the adjusting shaft member 12 is press-fitted to the attachment hole 8c in the support plate 8. In the press-fitting process, small dust and the like are pushed into the groove 12e. However, in the present invention, it is not essential to form the groove 12e.

Figure 8:
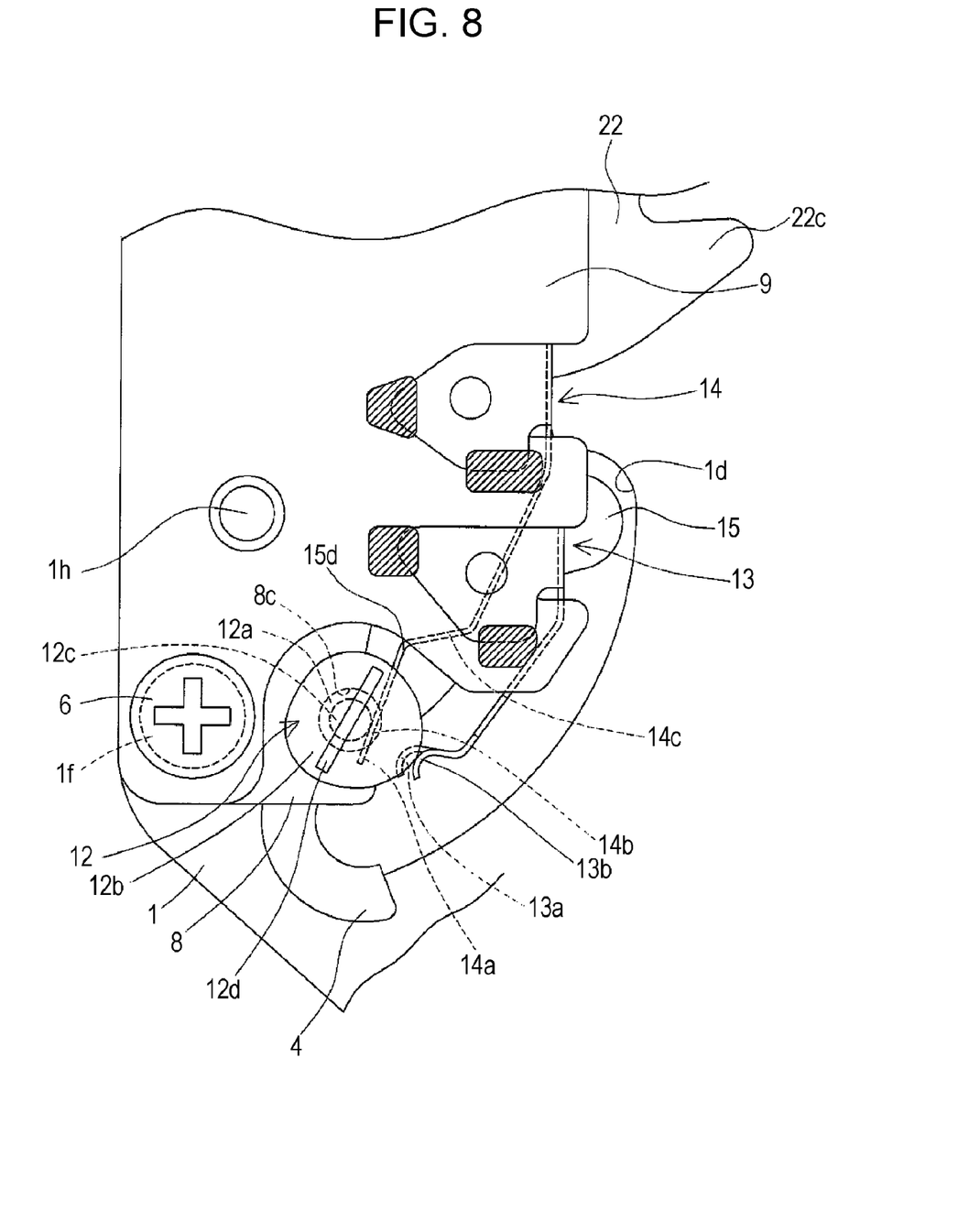
FIG. 8 is a plan view illustrating the state before an adjustment of a switch according to the embodiment.

The adjusting shaft member 12 may be press-fitted in any rotational position. An example of the state in which the adjusting shaft member 12 is attached to the support plate 8 by press-fitting is shown in FIG. 8. In this state, the gap between the contact portion 13a of the first contact member 13 and the contact portion 14a of the second contact member 14 is largest. Therefore, in the above-described shooting operation, the time at which the two contact portions 13a and 14a come into contact with each other is, of course, later than the predetermined time.

Figure 9:
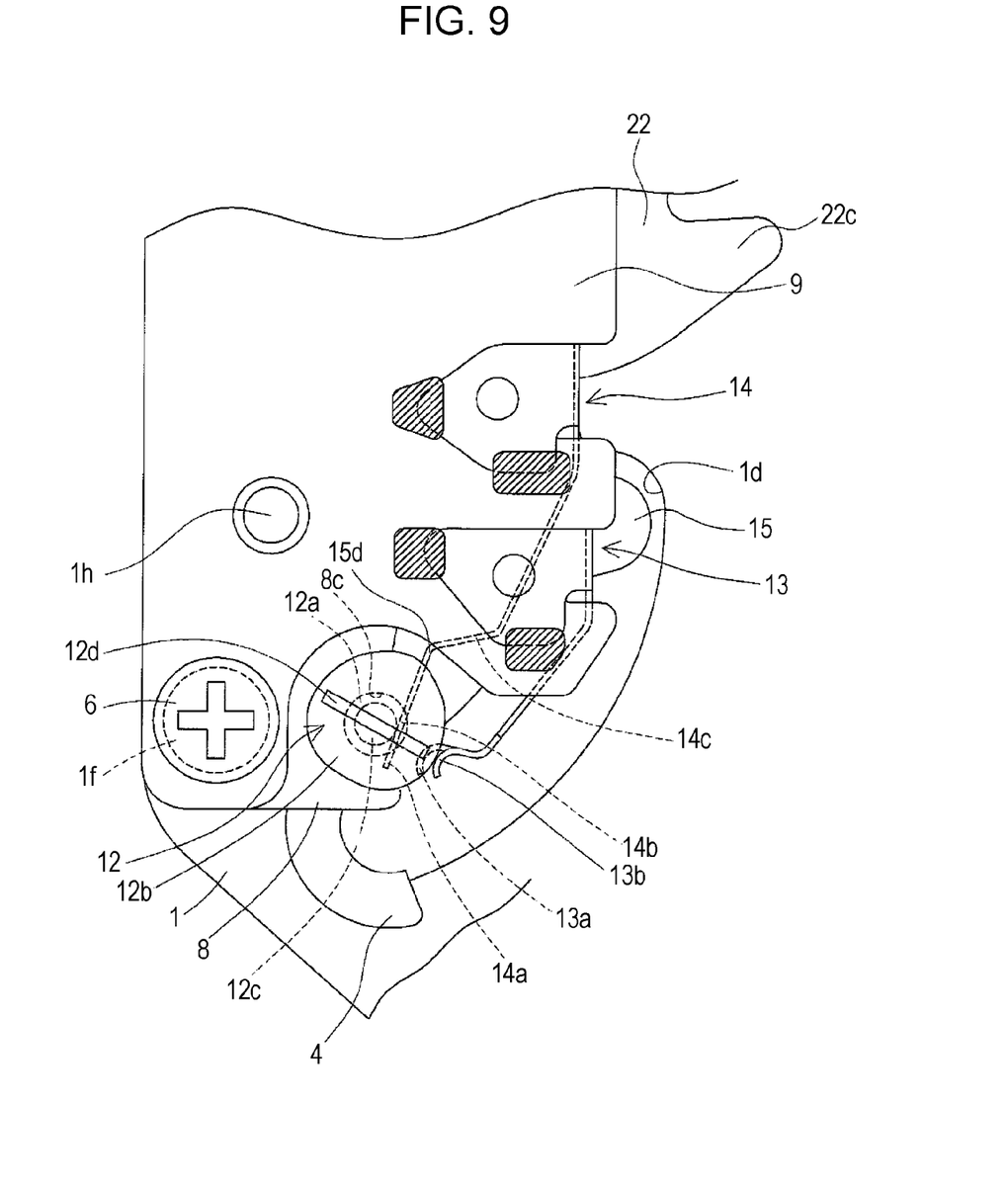
FIG. 9 is a plan view illustrating the state after the adjustment performed in the state illustrated in FIG. 8.

Therefore, in this case, a flat-blade screwdriver, for example, is inserted into the groove 12d and the adjusting shaft member 12 is rotated so as to reduce the gap between the two contact portions 13a and 14a. Then, the shutter is activated several times at different rotation angles, and it is determined whether or not the time of contact is appropriate from a measurement result of a measuring device. Thus, the optimum gap can be set, as illustrated in FIG. 9. According to the present embodiment, after the state shown in FIG. 9 is set, the adjusting shaft member 12 is fixed to the support plate 8 with an adhesive. According to the present embodiment, the peripheral surface of the second shaft portion 12c of the adjusting shaft member 12 has a circular shape centered on the rotation axis of the adjusting shaft member 12 (that is, the rotation axis of the attachment portion 12a). In addition, the second shaft portion 12c is formed in a cylindrical shape with a diameter smaller than the diameter of the attachment portion 12a. However, as is clear from the above description, according to the present invention, the shape of the second shaft portion 12c is not limited to the above-described shape, and may have a diameter equal to the diameter of the attachment portion 12a such that the attachment portion 12a and the second shaft portion 12c are formed in the shape of a single column.

As described above, according to the adjustment method of the present embodiment, the gap between the contact portions can be changed simply by rotating the adjusting shaft member 12. Therefore, unlike the related art, it is not necessary to cause plastic deformation of the contact members, and the adjustment process can be performed without producing defective products. In addition, since the gap continuously varies depending on the shape of the cam surface of the first shaft portion 12b, the adjustment process can be easily performed in a short time even by an unskilled worker. In the present embodiment, the adjusting shaft member 12 must be provided in addition to the structure of the related art. However, since the contact members 13 and 14 are both in contact with the adjusting shaft member 12 and the gap therebetween can be adjusted in the contact state, it is not necessary to form portions of, for example, the printed wiring board that come into contact with the positioning portions 13b and 14b in a complex shape, unlike the related art. Therefore, the cost of the printed wiring board or the like can be reduced. As a result, according to the present embodiment, the total cost can be reduced compared to that of the related art.

In the present embodiment, the adjusting shaft member 12 is attached to the support plate 8 by press-fitting the attachment portion 12a of the adjusting shaft member 12 to the attachment hole 8c in the support plate 8. Alternatively, however, external threads may be formed on the peripheral surface of the attachment portion 12a and internal threads may be formed on the inner peripheral surface of the attachment hole 8c, so that the attachment portion 12a can be screwed into the attachment hole 8c. In such a case, the adjusting shaft member 12 moves in the axial direction during the adjustment process. However, since the amount of movement is small, the movement does not cause any practical problem. In addition, according to the present embodiment, the adjusting shaft member 12 is rotated by using, for example, a screwdriver in the adjustment process. However, the first shaft portion 12b may instead be rotated with a pair of tweezers or the like, or by fingers in some cases. In addition, although the cam surface is formed on the first shaft portion 12b in the present embodiment, the cam surface may instead be formed on the second shaft portion 12c. In addition, according to the present embodiment, the adjusting shaft member 12 is press-fitted in a direction from the taking lens. However, the shapes of the two contact members 13 and 14 may be changed such that the adjusting shaft member 12 can be press-fitted in a direction from the shutter base plate 1. The above description applies also to the modifications of the adjusting shaft member 12, which will be described below.

Six modifications of the adjusting shaft member 12 according to the above-described embodiment will now be described with reference to FIGS. 10A to 10F. An adjusting shaft member 42 illustrated in FIG. 10A includes an attachment portion 42a, a second shaft portion 42c, and a groove 42d which have substantially the same shapes as those of the adjusting shaft member 12 according to the embodiment. However, the adjusting shaft member 42 includes a first shaft portion 42b that has a circular shape centered on an axis displaced from the rotation axis. An adjusting shaft member 52 illustrated in FIG. 10B includes an attachment portion 52a, a first shaft portion 52b, and a second shaft portion 52c which have substantially the same shapes as those of the adjusting shaft member 12 according to the embodiment. However, the adjusting shaft member 52 has a groove 52d that is cross-shaped.

Figure 10A:
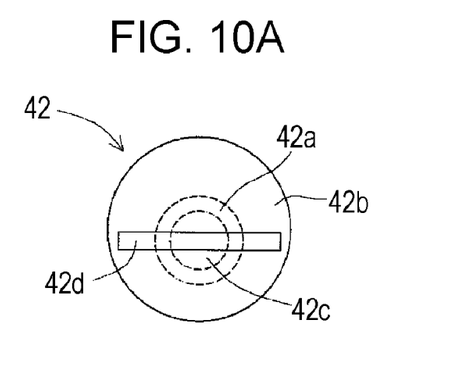
FIGS. 10A to 10C are plan views of the respective modifications and FIGS. 10D to 10F are side views of the respective modifications.
Figure 10B:
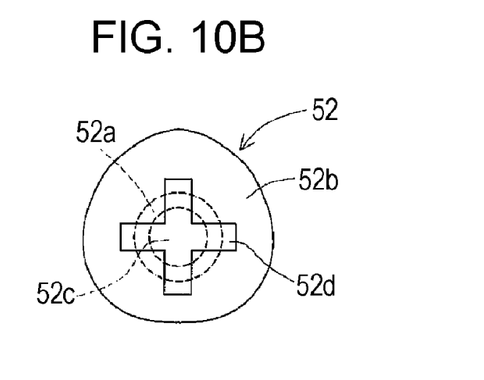
Figure 10C:
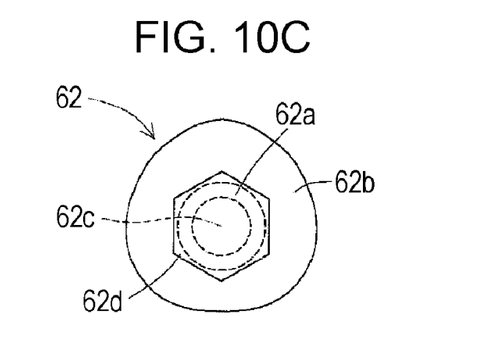
Figure 10D:
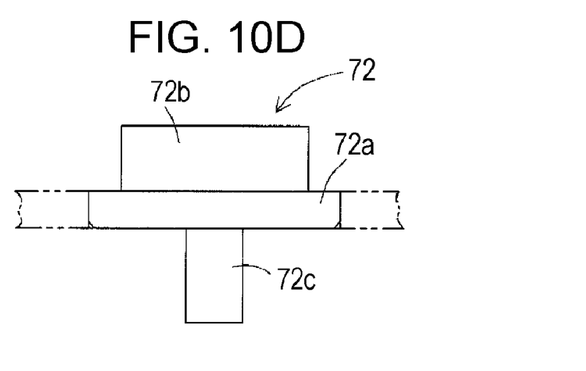

An adjusting shaft member 62 illustrated in FIG. 10C includes an attachment portion 62a, a first shaft portion 62b, and a second shaft portion 62c which have substantially the same shapes as those of the adjusting shaft member 12 according to the embodiment. However, the adjusting shaft member 62 includes a groove 62d that has a hexagonal shape. An adjusting shaft member 72 illustrated in FIG. 10D includes a first shaft portion 72b and a second shaft portion 72c which have substantially the same shapes as those of the adjusting shaft member 12 according to the embodiment. However, the adjusting shaft member 72 includes an attachment portion 72a whose radius is larger than the maximum distance from the rotation center to the peripheral surface of the first shaft portion 72b.

Figure 10E:
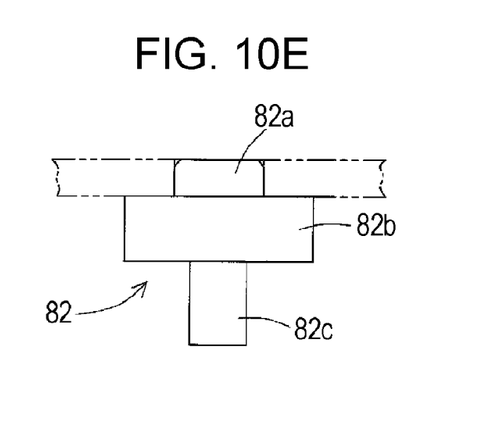
Figure 10F:
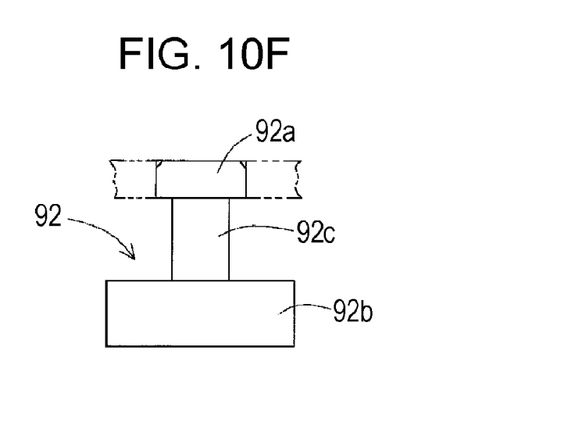

An adjusting shaft member 82 illustrated in FIG. 10E includes an attachment portion 82a, a first shaft portion 82b, and a second shaft portion 82c which have substantially the same shapes as those of the adjusting shaft member 12 according to the embodiment. However, the positions at which the attachment portion 82a and the first shaft portion 82b are formed are reversed from those in the embodiment. In this case, similar to the modification illustrated in FIG. 10D, the radius of the attachment portion 82a may be set to be larger than the maximum distance from the rotation center to the peripheral surface of the first shaft portion 82b. An adjusting shaft member 92 illustrated in FIG. 10F includes an attachment portion 92a, a first shaft portion 92b, and a second shaft portion 92c which have substantially the same shapes as those of the adjusting shaft member 12 according to the embodiment. However, the second shaft portion 92c is disposed between the attachment portion 92a and the first shaft portion 92b. In this case, the radius of the attachment portion 92a may be smaller than the radius of the second shaft portion 92c, or be set to be larger than the maximum distance from the rotation center to the peripheral surface of the first shaft portion 92b.

Next, a case in which the present invention is applied to a focal plane shutter including a single shutter blade group will be described. This type of focal plane shutter is used in digital cameras. As is well known, in general, an opening for an imaging optical path is fully opened by the shutter blade group before the shooting operation. The shooting operation is started in this state, and the opening for the imaging optical path is closed by the shutter blade group when the shooting operation is completed. Therefore, the focal plane shutter including a single shutter blade group has a structure similar to that of the above-described embodiment except the structure operationally related to the front blade group is omitted.

Therefore, in the case where the present invention is applied to the shutter having such a structure, a pushing portion corresponding to the pushing portion 15d of the front-blade driving member 15 is provided on the rear-blade driving member 19. In addition, the positions of the adjusting shaft member 12 and the two contact members 13 and 14 are set such that the second contact member 14 can be pushed by the pushing portion. Accordingly, a malfunction of the driving member or the shutter blade group caused when, for example, the battery is low can be detected.

What is claimed is:

1. A focal plane shutter for a camera, comprising:
    a shutter base plate having an opening for an imaging optical path, at least one shutter blade group being disposed between the shutter base plate and an auxiliary base plate;
    a support plate disposed at a side of the opening such that a plate surface of the support plate is parallel to the shutter base plate, the support plate being attached to the shutter base plate with a predetermined space provided between the support plate and the shutter base plate;
a printed wiring board stacked on the support plate;
at least one driving member disposed in the space and rotating to operate the shutter blade group;
an adjusting shaft member formed of an insulating material and including an attachment portion that is rotatably attached to the support plate and first and second shaft portions arranged along an axial direction of a rotation axis of the attachment member, a peripheral surface of one of the first and second shaft portions being formed as a circular peripheral surface centered on the rotation axis and a peripheral surface of the other one of the first and second shaft portions being formed as a cam surface such that a distance from the rotation axis to the cam surface varies;
a first contact member that is bonded to the printed wiring board at one end and that has a free end at the other end, the first contact member including, at positions near the free end, a contact portion and a positioning portion that comes into contact with and moves away from the peripheral surface of the first shaft portion and having a function of causing the positioning portion to come into contact with the peripheral surface of the first shaft portion by elasticity of the first contact member; and
a second contact member that is bonded to the printed wiring board at one end and that has a free end at the other end, the second contact member including a pushing portion at a position between the ends and, at positions near the free end, a contact portion and a positioning portion that comes into contact with and moves away from the peripheral surface of the second shaft portion and having a function of causing the positioning portion to come into contact with the peripheral surface of the second shaft portion by elasticity of the second contact member, the second contact member causing the contact portion of the second contact member to come into contact with the contact portion of the first contact member and causing the positioning portion of the first contact member to move away from the peripheral surface of the first shaft portion when the pushing portion is pushed by the driving member,
wherein a time at which the contact portions of the first and second contact members come into contact with each other is adjustable by rotating the adjusting shaft member.

2. The focal plane shutter according to claim 1,
wherein the attachment portion is provided between the first and second shaft portions in the adjusting shaft member, and
wherein the attachment portion and the one of the first and second shaft portions of which the peripheral surface is formed as the circular peripheral surface centered on the rotation axis of the attachment portion are formed in columnar shapes that are centered on the rotation axis and that have the same diameter.

3. The focal plane shutter according to claim 1,
wherein the attachment portion is provided between the first and second shaft portions in the adjusting shaft member, and
wherein the peripheral surface of at least one of the first and second shaft portions is formed such that a distance from the rotation axis to the peripheral surface is smaller than or equal to a distance from the rotation axis to the peripheral surface of the attachment portion.

4. The focal plane shutter according to claim 1,
wherein the adjusting shaft member is formed such that the attachment portion is at one end of the adjusting shaft member along the axial direction and one of the first and second shaft portions is at the other end of the adjusting shaft member along the axial direction.

5. The focal plane shutter according to claim 1,
wherein the printed wiring board is a rigid printed wiring board, and the adjusting shaft member is attached to the printed wiring board.

6. The focal plane shutter according to claim 1,
wherein the printed wiring board is a flexible printed wiring board,
wherein an accessory plate is stacked between the flexible printed wiring board and the support plate, and
wherein the adjusting shaft member is attached to the accessory plate.

7. The focal plane shutter according to claim 1,
wherein the contact portion and the positioning portion of at least one of the first and second contact members are disposed with a predetermined gap therebetween in an operating direction of the contact portion and the positioning portion.

* * * * *